United States Patent [19]

Schroeder

[11] Patent Number: 5,168,939
[45] Date of Patent: Dec. 8, 1992

[54] ELECTROMAGNETICALLY ACCELERATED IMPACT OIL WELL DRILL

[75] Inventor: Jon M. Schroeder, Leander, Tex.

[73] Assignee: Joseph F. Long, Austin, Tex. ; a part interest

[21] Appl. No.: 574,361

[22] Filed: Aug. 29, 1990

[51] Int. Cl.⁵ .................................. E21B 7/00
[52] U.S. Cl. .................... 175/4.5; 175/4.57; 175/16; 175/19
[58] Field of Search ................ 373/151–154; 175/4.5, 4.57, 19, 162, 16

[56] References Cited

U.S. PATENT DOCUMENTS

| | | |
|---|---|---|
| 4,238,637 | 12/1980 | Bingen et al. ........... 373/146 |
| 4,247,736 | 1/1981 | Grigoriev et al. ........ 373/154 |
| 4,568,809 | 2/1986 | Linn ...................... 373/151 |

Primary Examiner—Ramon S. Britts
Assistant Examiner—Roger J. Schoeppel
Attorney, Agent, or Firm—Joseph F. Long

[57] ABSTRACT

The electromagnetically accelerated impact oil well drill uses magnetic interaction of a ringing circuit formed in each of multiple accelerating coils with the electromagnetic field of charge rings around an expendable ice filled plastic drill head to accelerate the drillhead to hypervelocity with the drill head properly aligned to shoot down through an upper installed oil well casing. The oil well casing being fitted with a rapidly operating diverter valve to deflect effluent from the casing from blowing back into the electromagnetically accelerated impact drill.

12 Claims, 3 Drawing Sheets

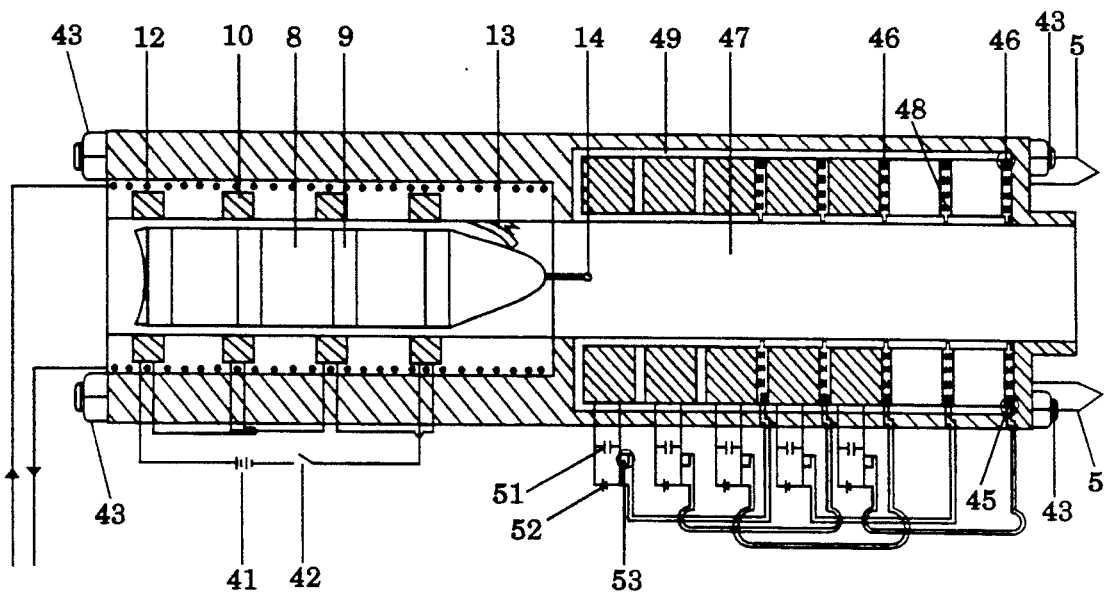
FIG. 2
FIG. 2A
FIG. 2B
FIG. 2C
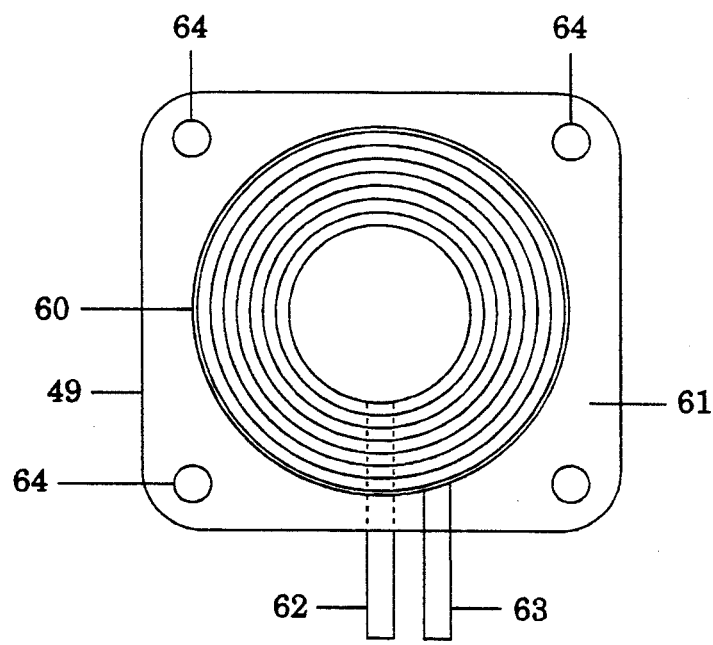
FIG. 3

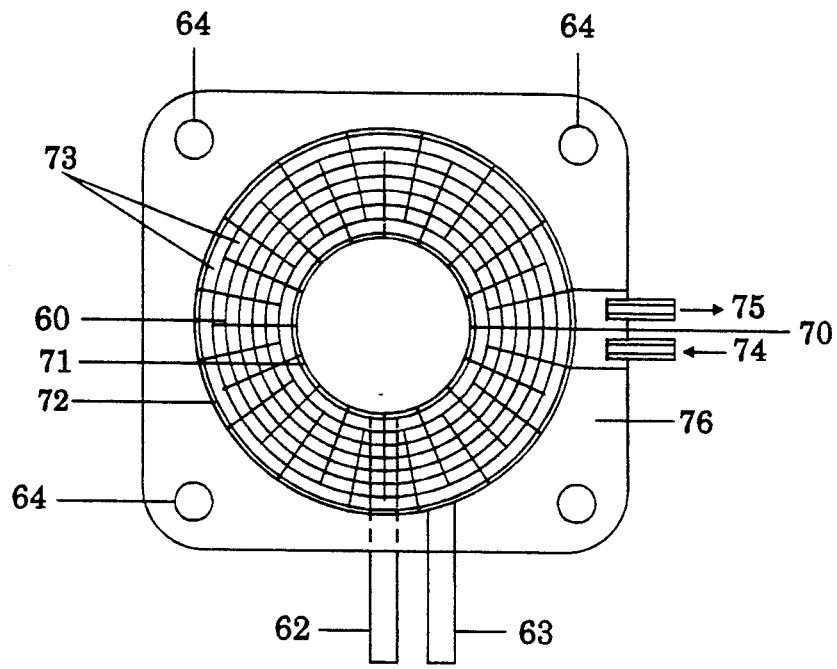
FIG. 4
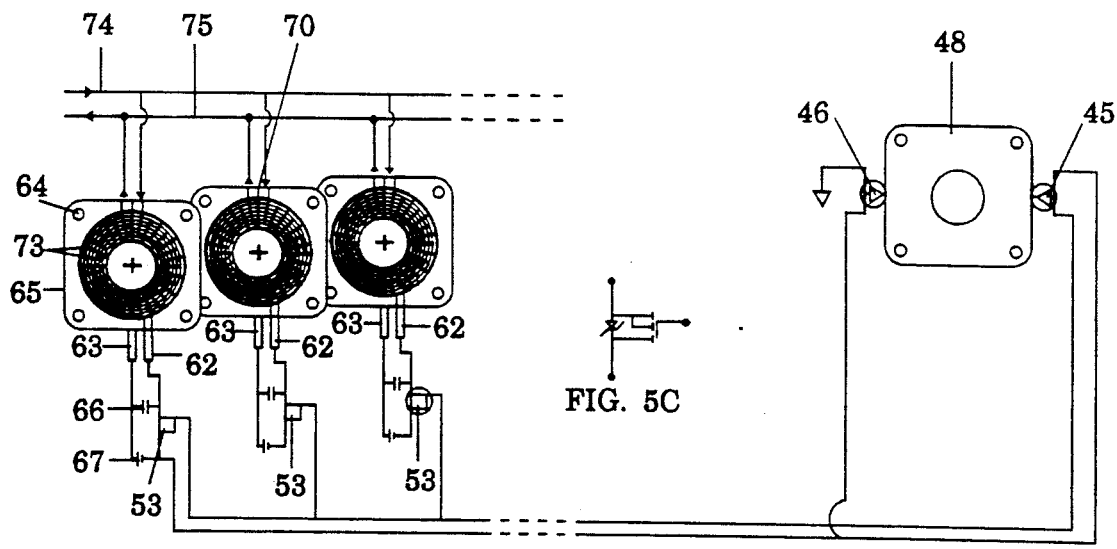
FIG. 5
FIG. 5A  FIG. 5B

ELECTROMAGNETICALLY ACCELERATED IMPACT OIL WELL DRILL

BACKGROUND AND SUMMARY OF THE INVENTION

There exists a need to rapidly and inexpensively drill holes through earth in vertical, slanted and horizontal positions. Oil wells are now drilled vertically or nearly so, usually with a slow rotary drill. Water wells are drilled vertically with either a hammer type impact drill or a rotary drill, usually in a vertical position. Usually ditching machines are used to dig the ditches, for laying pipe, burying cables and installing fiber optic cables. This invention is for drilling an oil well and uses an expendable electromagnetically accelerated drilling projectile or drill head to drill a hole by hyper velocity impact. The nearest prior art we find is my pending patent application for a High Speed Electromagnetically Accelerated Earth Drill, Ser. No. 07/491,276, filed Mar. 9, 1990, now U.S. Pat No. 4,997,047. However, this invention differs significantly in necessary mechanical structure.

We visualize that drilling an oil well would be started in the usual way and some twelve hundred feet of twenty-four inch diameter casing would be set. The electromagnetically accelerated impact oil well drilling equipment or drilling gun would then be hoisted into place in the derrick and aligned accurately to shoot an ice filled thin plastic projectile down through the casing at hyper velocity. In the approximately seventy-five foot long drilling gun the missile should attain a velocity of over 15,000 feet/second and our calculations indicate that this would penetrate over 50 to 100 feet of concrete, shale, soft rock or normally compacted sand. A special well effluent diverter is activated in a nanosecond after the drilling missile enters the casing. This is necessary to divert well effluent away from the interior of the drilling gun.

SUMMARY OF THE INVENTION

The equipment for drilling vertical holes in this invention encompasses an external housing to contain means to freeze water in an expendable drill head that has metallic induction rings on the drillhead. In use, the expendable drill head is air propelled into the firing chamber which is aligned with central cylindrical openings of multiple conductive wire coils called accelerator coils and separating spacers for the coils in an electromagnetic accelerator, an integral part of the drilling gun. Circuitry of each of the multiple conductive wire coils produces an alternating electromagnetic force or ringing circuit when a tip end of the expendable drill head interrupts a photo-electric cell circuit that acts to open a nanosecond switch in a charging circuit for each coil. The circuit to each coil includes a variable or fixed capacitor across the inlet leads. The frequency of the alternating electromagnetic force produced is controlled by the capacity of the capacitor while strength of the electromotive force is controlled by the charging voltage and construction of the coil. In a preferred embodiment a variable capacitor with multiple plates allows easy variation of capacitor capacity.

The coils may be relatively slowly charged using batteries or homopolar generators. Nanosecond switches are used to open the circuit to cause an alternating electromotive force quite generally called a ringing circuit and must be properly timed with arrival of the projectile or drill head a it is accelerated through the magnetic accelerator.

Acceleration is determined by strength of the electromotive forces generated in the accelerator coils and strength of the magnetic field on the expendable drill head and timing to have maximum interaction. Direct current charged coils induce current in aluminum or copper rings or other type conductive rings around the expendable drill head and opening the circuit of each accelerator coil allows production of high strength alternately aligned magnetic poles for the short duration time needed for acceleration through the electromagnetic accelerator to increase the speed after the drill head has been propelled into the accelerator by an air propellant chamber. Expected residence time after the drill head is air propelled into the unit should be less than two hundredths of a second.

The accelerator is prestressed to avoid separation of the coils during use and in one preferred embodiment is mounted between heavy rails with shock absorbers to minimize recoil and return the accelerator to position for continued use. In another embodiment, the accelerator is mounted between reinforced concrete bases of sufficient weight to absorb recoil. Adjustable mounting pads may be automatically adjusted to maintain the unit in proper alignment as expendable drill heads are serially fed into the accelerator unit.

In one preferred embodiment, the accelerator with double concrete side support is held upright by the drilling block in the usual oil field drilling rig in the same way as drill pipe is supported. The base of the accelerator may have interconnecting tapered dowels or tapered grooves or other alignment interlocking shapes in the floor of the drilling rig to assure proper alignment. The large primary oil well casing installed is equipped with a diverter valve that is activated in less than a nanosecond after each projectile is fired down through the primary casing. This diverter prevents effluent from the well from being thrown back into the drilling gun.

BRIEF DESCRIPTION OF THE DRAWINGS

FIGS. 1 and 1A show an upright view of the assembly.

FIGS. 2-2C show the accelerator with an expendable drill head in firing position with electronic circuitry.

FIG. 3 shows a top view of the induction coil as it is formed in plastic.

FIG. 4 shows a baffled cooling water path that is formed on top of each induction coil.

FIGS. 5-5C show an exploded view of a preferred embodiment wherein one accelerator coil unit is formed with three internal inductance coils electrically connected in parallel to act as one unit and with cooling water flow over each of the three inductance coils.

DESCRIPTION OF PREFERRED EMBODIMENT

Figure 1:
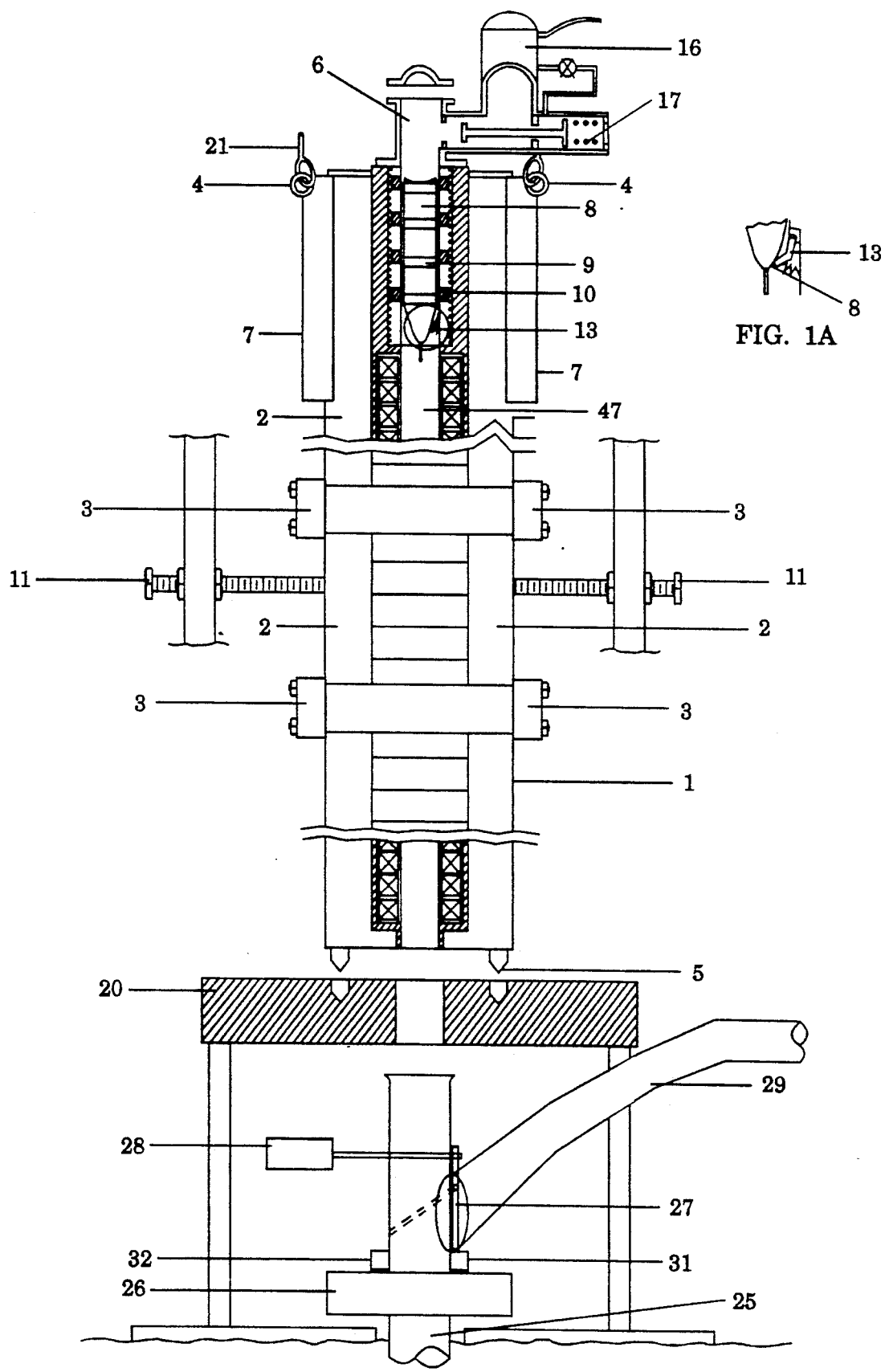

The electromagnetically accelerated impact oil well drill of this invention uses hardware best described from the drawings. The drawings refer to preferred embodiments but we will also describe some variations useable in other embodiments.

In FIG. 1 we show a section view indicating major hardware and arrangement. The unit 1 is meant to be moved using power means such as a crane or winch truck and lifting lugs 4 attached to steel head reinforcement 7 which is bolted integrally to concrete rails 2. In use, the weight of the unit is held by drilling rig lifting block through lifting cables 21 and the base is properly positioned by positioning guide 5 in drilling rig base 20. Proper alignment is critical and the unit is equipped with four adjustable alignment jacks 11 to allow proper lateral adjustment. A surveyor transit would be used for measurement to ascertain proper positioning. The base 20 may be weighted with concrete. In a preferred embodiment, concrete mounting rails 2 absorb reactive forces. In other embodiments, the recoil may be handled in several ways such as by bolting to a very heavy base, spring loading, and hydraulic shock absorbers.

An external storage compartment holds expendable drill heads 8 with means to cool and freeze water in the drill heads. The drill heads 8 with charge rings 9 may be hand fed through compressed air chamber 6 to rest on double spring loaded holder 13. When air is fed into chamber 16 and pressure builds up to about 500 psi to compress spring 17, the poppet valve opens and the ice filled drill head 8 is propelled into the accelerator barrel 47. An explosive charge could also be used for this initial acceleration.

Drill head 8 is electromagnetically accelerated throughout the length of acceleration barrel 47 and is aligned to enter casing 25. As the tip of the drill head 8 breaks a light beam from light source 31 to photochemical cell 32 conventional electrical circuitry activates diverter valve flapper drive coil to position diverter valve flapper 27 to cause effluent from the casing 25 to blowback through blowout preventer 26 and out diverter exit line 29.

Multiple clamps 3 clamp the coil assembly between rails 2. Depending upon size of the unit two or four rails 2 may be used. Alignment jacks 11 near the top of the unit are used to adjust the unit to perfect vertical position. Any of several methods may be used for the checking to make certain the unit is exactly vertical and properly aligned with casing 25.

In FIG. 2 we show one of the simple versions of the ice filled drill head. Many other type drill heads of non-conducting crushable material could be visualized. The drill heads have two or more, usually four conductive metal rings 9 and are filled with water which is held frozen by refrigeration coils 12. Induction coils 10 induce current in rings 9 when a switch 42 is closed. Charge rings 9 are preferably made of aluminum. Switch 42 may be interlocked to open when pressure in chamber 6, FIG. 1, is just sufficient to open spring holder 13. When the expendable drill head 8 leaves the mounting position, flow of current in the conductive rings 9 creates alternate N-S magnetic fields. Tip 14 is of a length that properly times opening of nanosecond switch 53 by activating photoelectrical cell 45 by interference of tip 14 with a light path from source 46 to the photoelectric cell 45.

Calculations indicate that with less than thirty electromagnetic accelerator coils 49, using four conductive rings 9 around a cylindrical expendable ice filled drill head 8 that, when capacitors 51 are properly sized to vary the frequency of the current to make maximum use of stored electrical energy, velocities of 5 miles per second or more may be reached. Maximum use of electrical energy occurs when N-S, S-N, N-S, etc., magnetic force interaction is such that the first pulse in coils 49 acts to "push" the first conductive ring 9 while pulling the second conductive ring 9 and the second pulse acts to "push" the second conductive ring 9 while pulling the third ring 9 and the third pulse acts to "push" the third ring 9, etc. As the expendable drill head 8 increases in velocity the second ring comes into the force field generated by the electromagnetic accelerator coils more rapidly. Therefore, for maximum efficiency the frequency of the generated current must increase as the velocity of the expendable drillhead increases. This frequency may be increased by reducing the capacitance of the capacitor 51. In this manner, nearly constant acceleration may be achieved. Calculations would indicate some small efficiency increase by varying the spacing of the second, third and fourth conductive rings on the expendable drill head.

With electrical circuit as shown in FIG. 2 the rings 9 will have alternate N-S, S-N, N-S magnetic force field. The induced electromagnetic force in rings 9 exists for sufficient time for acceleration to speeds in the range of five miles per second.

Also shown in FIG. 2, accelerator coils 49, also referred to as electromagnetic propellant rings, are made of multiple turns of insulated conductive wire such as copper, wound in a coil with a square cross section and potted in a hard resin. In a preferred embodiment, the conductive wire is ribbon shaped. Spacer rings 48 are made of a non-conducting material in a shape similar to the accelerator coils. We've indicated a light source 46 and photoelectrical cells 45 in the spacer rings 48, with one extra at the end of the accelerator. Spacer rings 48 and coils 49 are arranged in a gun barrel-like configuration. Leads from accelerator coils 49 go through a nanosecond switch 53 such as a Power MOS-FET switch to a D.C. source 52. A capacitor 51 is across the leads going to the power source. The capacitor may be a variable capacitor with multiple plates with multiple take off leads to allow in-service choice of sufficient plates to give desired microfared capacity. Differing size capacitors 51 vary the frequency of the "ringing" type circuit caused when switch 53 is opened after coils 49 are charged by batteries 51. Note that other types of D.C. source such as homopolar generators or an A.C. rectifier could replace the batteries. As shown in FIG. 3, the coils 49 and spacers 48 are square and four large bolts 43, FIG. 2, through holes 64 are used to pre-load the coils and spacers to form the barrel.

FIG. 3 shows a top view as an accelerator coil 49 is formed. An insulated copper ribbon 60 is wound in a coil with an exit lead 62 creased to lay flat on top of the coil 60 and a flat inlet lead 63 attaching to an inlet end of coil 60. A simple form, which may be of any of several plastics, and is about ⅜ of an inch higher than the thickness of the coil 60, is placed to form an exterior baffle with other cylindrical forms of the same height placed to form holes 64 and a hard plastic such as an epoxy poured to be level with the top edge of coil 60. Now, when the coil 60 is charged and discharged rapidly enough, heat is generated and FIG. 4 shows the cooling face 76 formed on top of coil 60 in FIG. 3 as follows: the edge of coil 60 is coated with an acrylic glue and flat ceramic strips 73 approximately ¼ inch de and ⅜ inch thick are laid as shown between an inner 0 ring 71 and outer O ring 72; a baffle 70 separates a plastic water inlet line 74 and exit line 75. A hard plastic, such as epoxy, is poured exterior of O ring 72 to be just slightly below the top of O ring 72 to form face 76. Face 76 is then coated with acrylic glue and three segments formed as described are glued together to form one accelerator coil, in one preferred embodiment. In other embodiments with electrical connections as shown in FIG. 2 one accelerator coil is made with a single internal insulated metal coil which may be either of an insulated metal ribbon or insulated wire.

In FIG. 5 we've shown a three part accelerator coil 65 as described, which is a preferred embodiment, indicating that the ringing circuit in each coil is formed simultaneously since MOS-FET nanosecond switches 53 are connected in parallel with a photoelectric sensor 45 in spacer 48 activating the switches 53. A D.C. source 67 which may be a battery charges the internal copper coils 60, FIG. 3. The three units are glued together thereby forming three internal coils that are wired to act simultaneously and have cooling water on each side, with inlet water 72 traveling between baffles 73 and out to exit header through exit line 75. An increase in effectiveness of the accelerator coils 65 may be realized by chilling the cooling water to the coils or by cooling using a refrigerant.

Since many mechanical and electrical details may be changed without altering the function, we do not wish to be limited to exact details, but only as to the spirit and purpose as outlined in these claims and specifications.

I claim:
1. An Electromagnetically Accelerated Impact Oil Well Drill comprising:
   a) a housing means fastened between two reinforced concrete beam means;
   b) multiple accelerating coil means in said housing means with a cylindrical open center in each of said multiple accelerating coil means;
   c) a D.C. charging means exterior of said housing means with inlet and exit leads to each of said multiple accelerating coil means;
   d) a variable capacitor means connected across said inlet and exit leads of said multiple accelerating coil means;
   e) a nanosecond switch located in each one of said inlet leads to said D.C. charging means;
   f) a spacer means with a cylindrical open center and containing an activating means for said nanosecond switch between each of said multiple accelerating coil means;
   g) a drill head means of a size to pass through said cylindrical open center of said multiple accelerating coil means;
   h) a holding means in a beginning end of said housing means to hold said drill head means aligned with said cylindrical open center of said multiple accelerating coil means;
   i) a means to create spaced alternating magnetic poles around said drill head means;
   j) a primary accelerating means to propel said drill head means into a first one of said multiple accelerating coil means in said housing means;
   k) a diverter means located at a discharge end of said housing means.
2. An Electromagnetically Accelerated Impact Oil Well Drill as in claim 1 wherein said two reinforced concrete beam means further comprises:
   a) a clamping means to clamp said housing means between two reinforced concrete beams; said housing means comprising said multiple accelerating coil means and said spacer means held together with a compression bolts going through each of four corners of said multiple accelerating coils means and said spacer means;
   b) curved projections on a base of each of said two reinforced concrete beams to fit positioning grooves on a mounting base;
   c) lifting lugs fastened to a steel head reinforcing cap on a beginning end of said two reinforced concrete beam to allow holding said two reinforced concrete beams vertically when connected by cable to an oil well drilling block;
   d) alignment jacks to allow vertical alignment of said two reinforced concrete beams.
3. An Electromagnetically Accelerated Impact Oil Well Drill as in claim 1 where said means to create spaced alternating magnetic poles around said drill head means comprises a minimum of three separate conductive rings with induction coil means in said holding means for said drill head means to induce alternate N-S, S-N magnetic poles in said three separate conductive rings.
4. An Electromagnetically Accelerated Impact Oil Well Drill as in claim 2 wherein a separate housing means comprises storage for multiple batteries, storage for said drill head means, and cooling means for said drill head means.
5. An Electromagnetically Accelerated Impact Oil Well Drill as in claim 1 wherein said D.C. charging means comprises homopolar generators.
6. An Electromagnetically Accelerated Impact Oil Well Drill as in claim 1 wherein said primary accelerating means comprises a compressed air chamber connected to a compressed air drill head accelerator chamber, wherein when air pressure in said compressed air chamber reaches a preset pressure a poppet valve in said compressed air chamber opens to admit air to said drill head accelerator chamber to eject a drill head from said compressed air drill head accelerating chamber.
7. An Electromagnetically Accelerated Impact Oil Well Drill as in claim 1 wherein said variable capacitor means is a multiple plate capacitor with multiple take off leads to allow in-service choice of sufficient plates to give desired microfared capacity.
8. An Electromagnetically Accelerated Impact Oil Well Drill as in claim 1 wherein each of said multiple accelerating coil means contains water cooling means.
9. An Electromagnetically Accelerated Impact Oil Well Drill as in claim 1 wherein said activating means for said nanosecond switch comprises light generating means in each of said spacer means striking a photoelectrical cell pick up on an opposite side of said cylindrical open center of said spacer means with a light interrupting means mounted on an extended portion of said drill head means activating said photoelectrical cell pick up to activate said nanosecond switch.
10. An Electromagnetically Accelerated Impact Oil Well Drill as in claim 1 wherein said drill head means further comprises a hollow cylindrical plastic container encircled with a minimum of three conductive rings and filled with water.
11. An Electromagnetically Accelerated Impact Oil Well Drill as in claim 1 further comprising a deflector means to prevent material accelerated upward from a hole being drilled from entering said accelerator means.
12. An Electromagnetically Accelerated Impact Oil Well Drill as in claim 1 wherein each of said multiple accelerating coil means comprises three metallic coils separated with a water cooling means on each side of each of said three metallic coils and wherein said three metallic coils are electrically connected in parallel to act in unison to produce a ringing circuit which produces an alternating electromagnetic field.

* * * * *